(12) United States Patent
Chen et al.

(10) Patent No.: US 8,837,077 B1
(45) Date of Patent: Sep. 16, 2014

(54) COMPUTER SYSTEM AND CONTROLLING METHOD FOR HARD DISK

(71) Applicant: Wistron Corporation, New Taipei (TW)

(72) Inventors: Po-Cheng Chen, New Taipei (TW); Chia-Lung Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/035,968

(22) Filed: Sep. 25, 2013

(30) Foreign Application Priority Data

Jul. 29, 2013 (TW) .............................. 102127170 A

(51) Int. Cl.
*G11B 21/02* (2006.01)
*G11B 5/55* (2006.01)
(52) U.S. Cl.
CPC .................................... *G11B 5/5582* (2013.01)
USPC .......................................................... 360/75
(58) Field of Classification Search
None
See application file for complete search history.

(56) References Cited

U.S. PATENT DOCUMENTS

| 8,390,949 | B2 | 3/2013 | Ahmad et al. | |
|---|---|---|---|---|
| 2006/0284833 | A1* | 12/2006 | Lin et al. | 345/156 |
| 2010/0046115 | A1* | 2/2010 | Lammel | 360/110 |

\* cited by examiner

*Primary Examiner* — Andrew L Sniezek
(74) *Attorney, Agent, or Firm* — Jianq Chyun IP Office

(57) ABSTRACT

A computer system and a controlling method for a hard disk are provided. The computer system includes a case, a hard disk, a pressure sensor and a controller. The hard disk is disposed in the case and includes a platter and head, which is used to access the platter in an access range. The pressure sensor is disposed between the hard disk and the case, and is configured to obtain a pressure value. The controller is coupled to the pressure sensor and the hard disk, and is configured to determine if the pressure value is larger than or equal to a threshold. If the pressure value is larger than or equal to the threshold, the controller issues a command to the hard disk, such that the head leaves the access range. Accordingly, the hard disk is prevented from being damaged.

14 Claims, 4 Drawing Sheets

COMPUTER SYSTEM AND CONTROLLING METHOD FOR HARD DISK

CROSS-REFERENCE TO RELATED APPLICATION

This application claims the priority benefits of Taiwan application serial no. 102127170, filed on Jul. 29, 2013. The entirety of the above-mentioned patent applications is hereby incorporated by reference herein and made a part of this specification.

BACKGROUND

1. Field of the Invention

The present invention is directed to a computer system and more particularly, to a computer system equipped with a pressure sensor and a controlling method for a hard disk.

2. Description of Related Art

With the development of technology, mobile apparatuses tend toward being thinner and lighter. Taking notebook computers for example, users commonly prefer products with small thicknesses and light weights. However, when a notebook computer (NB) becomes thinner and lighter, it represents that elements in the NB are closer to each other and a case of the NB may be probably thinner. Accordingly, when the NB is subjected to a force from the external, it would lead some elements therein to damages. For instance, if the NB is equipped with a hard disk having a head and a platter, then the platter may be scratched by the head when the hard disk is pressed by the external force. Therefore, how to prevent the hard disk of the NB from being damaged due to the external force is an important issue concerned by technicians of the field.

SUMMARY

The present invention is directed to a computer system and a controlling method for a hard disk capable of preventing the hard disk from being damaged.

According to an embodiment of the present invention, a computer system including a case, a hard disk, a pressure sensor and a controller is provided. The hard disk is disposed in the case and includes a platter and a head. The head is configured to access the platter within an access range. The pressure sensor is disposed between the hard disk and the case and configured to obtain a pressure value. The controller is coupled to the pressure sensor and the hard disk and configured to determine whether the pressure value is larger than or equal to a threshold. If the pressure value is larger than or equal to the threshold, the controller issues a command to the hard disk, such that the head leaves the access range.

In an embodiment of the present invention, the hard disk further includes a spindle, and the pressure sensor is disposed between the spindle and the case.

In an embodiment of the present invention, the command is a parking command, and the controller issues the parking command to the hard disk so as to park the head at a landing zone of the platter.

In an embodiment of the present invention, after the head is parked, the pressure sensor re-obtains the pressure value, and the controller determines whether the re-obtained pressure value is smaller than the threshold. If the re-obtained pressure value is smaller than the threshold, the controller instructs the head to move to the access range.

In an embodiment of the present invention, the controller instructs the head to move to a specific position in the access range.

In an embodiment of the present invention, the threshold is calculated according to a pressure limit of the hard disk.

In an embodiment of the present invention, the pressure sensor is a thin-film pressure sensor.

According to another embodiment of the present invention, a controlling method for a hard disk is provided, which is applicable to a computer system. The computer system includes a case, a hard disk, and a pressure sensor. The pressure sensor is disposed between the hard disk and the case, hard disk the hard disk comprises a platter and a head, and the head is configured to access the platter within an access range. The controlling method for the hard disk includes obtaining a pressure value by using the pressure sensor, determining whether the pressure value is larger than or equal to a threshold and if the pressure value is larger than or equal to the threshold, issuing a command to the hard disk to instruct the head to leave the access range instruct the head to leave the access range.

In an embodiment of the present invention, the step of instructing the head to leave the access range includes issuing a parking command to the hard disk so as to park the head to a landing zone of the platter. Afterward, the controlling method for the hard disk further includes re-obtaining the pressure value by using the pressure sensor, determining whether the re-obtained pressure value is smaller than the threshold and if the re-obtained pressure value is smaller than the threshold, instructing the head to move to the access range.

Based on the above, in the computer system and the controlling method for the hard disk proposed by the embodiments of the present invention, whether to move the head away from a region storing data on the platter may be determined according to the pressure value sensed by the pressure sensor. Thereby, damages to the platter or the head due to the computer system subjected to an excessive force in operation can be prevented.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
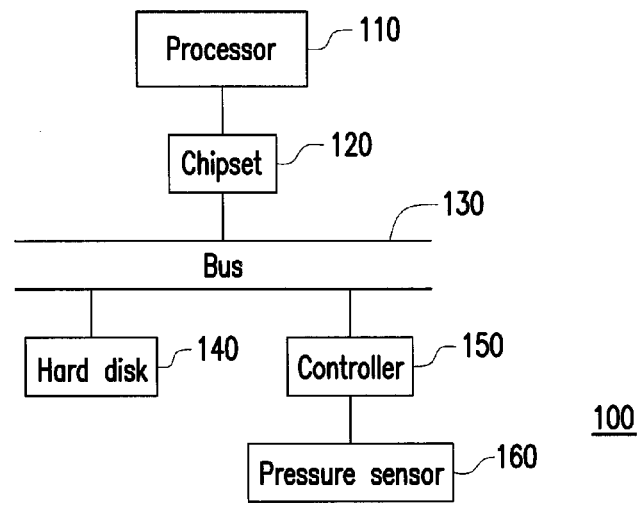
FIG. 1 is a block diagram illustrating a computer system according to an embodiment of the present invention.

FIG. 1 is a block diagram illustrating a computer system according to an embodiment of the present invention.

With reference to FIG. 1, a computer system 100 at least includes a processor 110, a chipset 120, a bus 130, a hard disk 140, a controller 150 and a pressure sensor 160. In the present embodiment, the computer system 100 is implemented as a notebook computer; however, in other embodiments, the computer system 100 may also be implemented as any other electronic apparatus, such as a digital camera, which constructs no limitations to the present invention. It should be noticed that the computer system 100 may also include other elements, such as memories or transmission modules, but the present invention is not limited thereto.

The processor 110 is, for example, a central processor. The chipset 120 is, for example, a Northbridge chip, Southbridge chip or a combination thereto. The processor 110 is coupled to the hard disk 140 and the controller 150 via the chipset 120 and the bus 130. The controller 150 is, for example, an embedded controller (EC) or a keyboard controller (KBC). The pressure sensor 160 is disposed near the hard disk 140 and configured to sense a pressure value (e.g., outputting a voltage representing the pressure value). The controller 150 is coupled to the pressure sensor 160 and configured to obtain the pressure value sensed by the pressure sensor 160.

Figure 2:
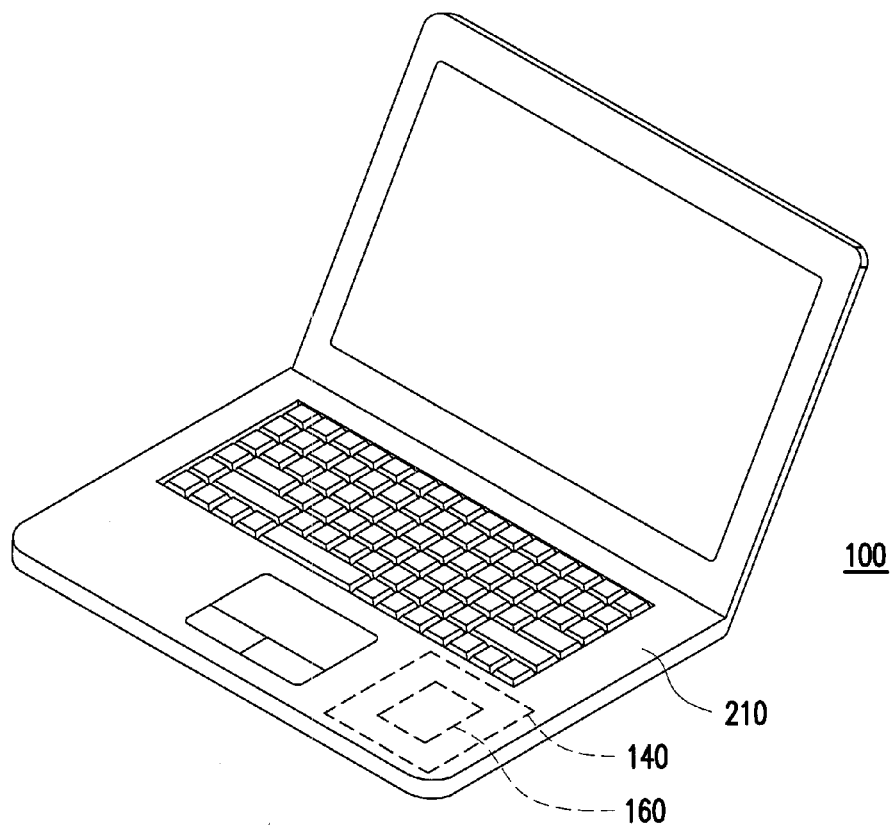
FIG. 2 is a schematic diagram illustrating a configuration of the computer system according to an embodiment of the present invention.
Figure 3:
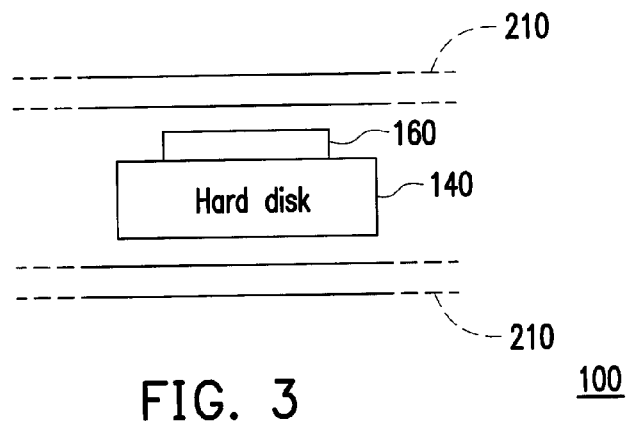
FIG. 3 is a cross-sectional diagram illustrating the computer system according to an embodiment of the present invention.

FIG. 2 is a schematic diagram illustrating a configuration of the computer system according to an embodiment of the present invention. FIG. 3 is a cross-sectional diagram illustrating the computer system according to an embodiment of the present invention.

With reference to FIG. 2 and FIG. 3 simultaneously, the computer system 100 includes a case 210, and the hard disk is disposed in the case 210. In the present embodiment, the pressure sensor 160 is a thin-film pressure sensor and disposed between the hard disk 140 and the case 210. However, in other embodiments, the pressure sensor 160 may also be any other type of pressure sensor, and the pressure sensor 160 may be disposed on the bottom or at a side of the hard disk 140, but the present invention is not limited thereto.

Figure 4:
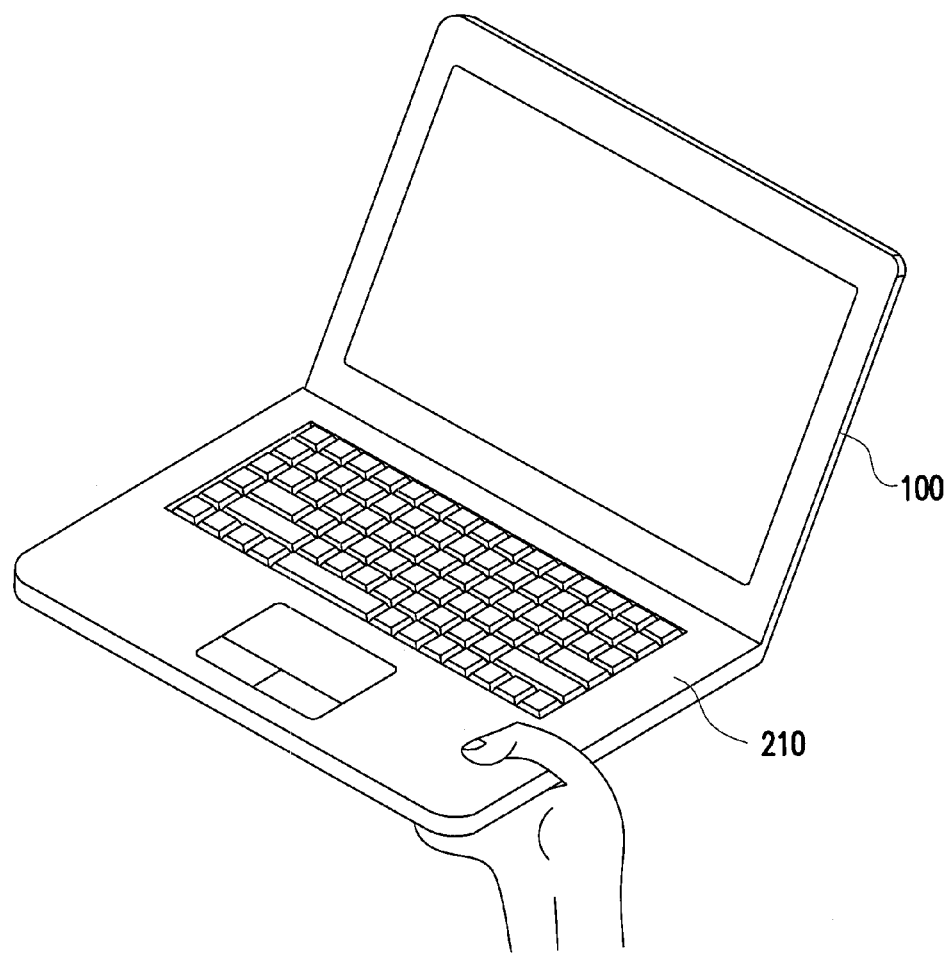
FIG. 4 is a schematic diagram illustrating a scenario where the computer system is subjected to a force from the external according to an embodiment of the present invention.
Figure 5:
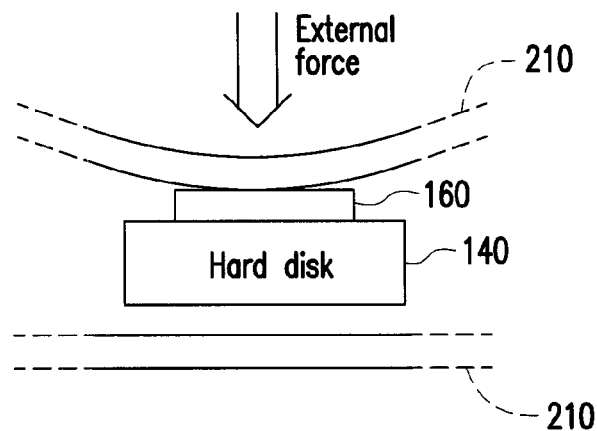
FIG. 5 is a cross-sectional diagram illustrating a scenario where the computer system is subjected to a force from the external according to an embodiment of the present invention.

FIG. 4 is a schematic diagram illustrating a scenario where the computer system is subjected to a force from the external according to an embodiment of the present invention, and FIG. 5 is a cross-sectional diagram illustrating a scenario where the computer system is subjected to a force from the external according to an embodiment of the present invention.

With reference to FIG. 4 and FIG. 5 simultaneously, when a user wants to carry the computer system 100 to move, his/her hand probably presses and hold the case 210, while the case probably presses the hard disk 140 in an indirect way. In this scenario, if a head of the hard disk 140 is reading data from/writing data in a platter, the platter may be scratched by the head due to the hard disk 140 subjected to the aforementioned force. In order to avoid the situation, in the present invention, after the computer system 100 is booted, as long as a pressure applied to the hard disk 140 is larger than or equal to a threshold, the head is instructed to park so as to prevent the platter from being scratched, and thus, the data is protected.

Figure 6:
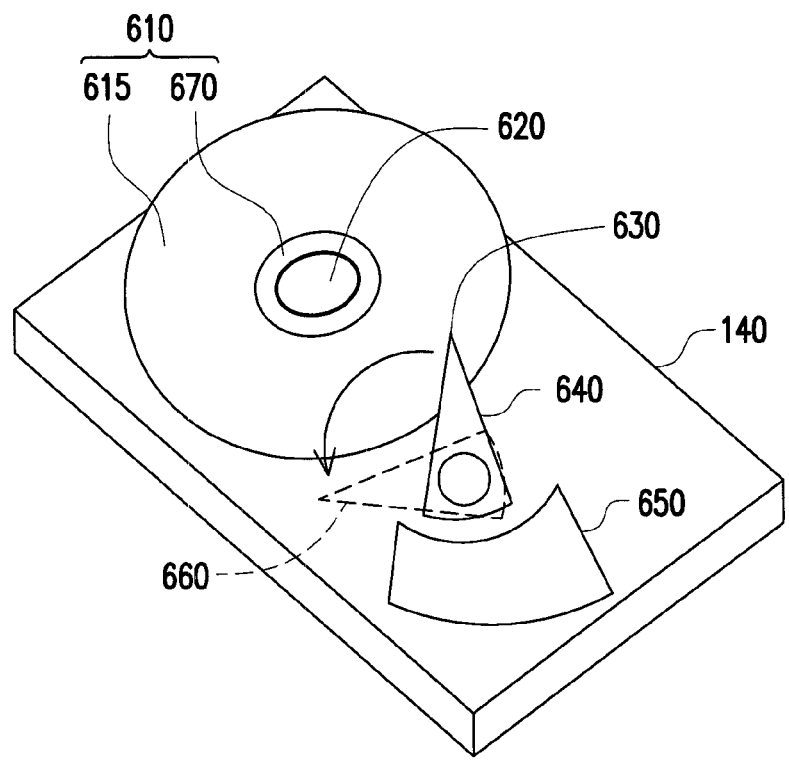
FIG. 6 is a schematic diagram illustrating the structure of a hard disk according to an embodiment of the present invention.

FIG. 6 is a schematic diagram illustrating the structure of a hard disk according to an embodiment of the present invention.

With reference to FIG. 6, the hard disk 140 includes a platter 610, a spindle 620, a head 630, an actuator arm 640 and an actuator 650. There is a plurality of concentric circles on the platter 610, and each of the concentric circles is referred to as a track. The platter 610 rotates around the spindle 620, such that the head 630 may access data on one of the tracks. The actuator 650 is configured to turn the actuator arm 640, such that the head 630 may be moved from one track to another. All the tracks construct an access range (i.e., a data region 615 for storing data). That is to say, the head 630 is configured to access the platter 610 within the access range. For instance, the platter 610 includes 100 tracks (assigned with no. 0 through no. 99), and the head 630 accesses data in the 100 tracks. If the actuator 650 moves the head 630 to a track no. 100 or track no. −1, it represents that the head 630 leaves the access range, and is not capable of reading data from the platter 610. In the present embodiment, a region on the platter 610 and near the spindle 620 which is not used to store data is referred to as a landing zone 670.

With reference to FIG. 1 and FIG. 6 simultaneously, after the computer system 100 is booted up, the processor 110 reads data from the hard disk 140, that is, the head 630 moves into the aforementioned access range (the data region 615). At this time, the pressure sensor 160 continuously senses a pressure value, and the pressure value reflects a pressure borne by the hard disk 140. The controller 150 determines whether the pressure value is larger than or equal to a threshold. If the pressure value is larger than or equal to the threshold, the controller 150 issues a command to the hard disk 140, so that the head 630 leaves the access range (e.g., moves to a position 660 out of the platter 610 or moves to a landing zone 670). For instance, the controller 150 may issue a parking command to the hard disk 140, such that the head 630 is parked at the landing zone 670. Alternatively, the controller 150 may issue a seeking command to the hard disk 140, and the seeking command instructs the actuator arm 640 to move to a track having a number greater than no. 99 or smaller than no. 0. The present invention is not intent to limit how the controller 150 instructs the head 630 to leave the access range. By doing so, when the pressure applied to the hard disk 140 is larger than or equal to the threshold, the head 630 is not located on the platter 610, such that the surface of the platter 610 may be prevented from being scratched by the head 630.

In an embodiment of the present invention, the threshold is calculated according to a pressure limit of the hard disk 140. Such pressure limit is provided by the manufacturer of the hard disk 140. For instance, the pressure limit is 1 kg when the hard disk 140 is in operation, and the pressure limit is 2 kg when the hard disk 140 is not in operation. However, the present invention is not intent to limit the value of the pressure limit. In an embodiment of the present invention, when calculating the pressure limit, what the manufacturer of the hard disk 140 measures is a pressure on the spindle 620, and thus, the pressure sensor 160 is disposed between the spindle 620 and the case 210. However, when the manufacturer of the hard disk 140 measures another pressure on somewhere else, the pressure sensor 160 may also be correspondingly disposed in another place, which constructs no limitations to the present invention.

After the head 630 is parked, the pressure sensor 160 re-obtains the pressure value. The controller 150 determines whether the re-obtained pressure value is smaller than the threshold. If the re-obtained pressure value is smaller than the threshold, the controller 150 cancels the parking of the head 630. That is to say, the head 630 re-enters the access range to access the data on the platter 610. For instance, the controller 150 instructs the head 630 to move to a specific position in the access range, and the specific position may be the 0th track on the platter 610, or the track position where the data being accessed is stored before the parking.

In the present embodiment, the controller 150 continuously determines whether the pressure value is larger than or equal to the threshold after the computer system 100 is booted up. However, in other embodiments, the controller 150 may also execute the determination step every time when the hard disk 140 is about to access the data. Alternatively, the controller 150 may execute the determination step regularly or irregularly. The present invention is not intent to limit when the controller 150 executes the determination to move the head 630.

It is to be noticed that when the head 630 is parked (when the head 630 is moved at the position 660 out of the platter 610 or at the landing zone 670), the head 630 is incapable of accessing the data on the platter 610. Thus, the user would encounter a scenario that the response time of the computer system 100 is delayed. However, in the scenario, the user presses the hard disk while moving, and while moving, the user will not use the computer system 100 so frequently. That is to say, the user would not obviously sense the delayed response time, and how to prevent the hard disk 140 from being damaged is relatively more important. On the other hand, if the controller 150 issues the parking command while the hard disk 140 accessing the data, the access operation of the hard disk 140 is temporarily stopped, after the parking is cancelled, the hard disk 140 may resume to execute the uncompleted access operation, or send an error message to the processor 110, but the present invention is not limited thereto.

Figure 7:
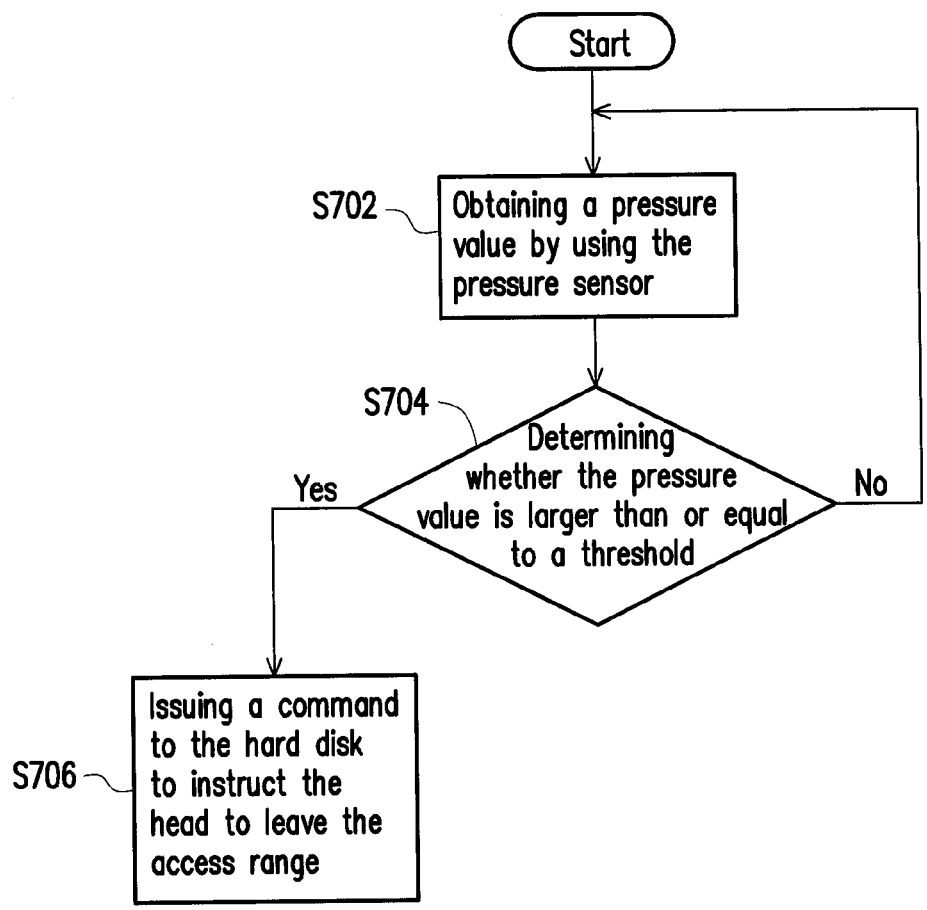
FIG. 7 is a flowchart illustrating a controlling method for a hard disk according to an embodiment of the present invention.

FIG. 7 is a flowchart illustrating a controlling method for a hard disk according to an embodiment of the present invention.

With reference to FIG. 7, in step S702, a pressure value is obtained by using the pressure sensor 160. In step S704, whether the pressure value is larger than or equal to a threshold is determined. If the pressure value is smaller than the threshold, step S702 is returned to re-obtain the pressure value. If the pressure value is larger than or equal to the threshold, in step S706, a command is issued to the hard disk, such that the head leaves an access range. Nevertheless, each step illustrated in FIG. 7 is described above and will not be repeated hereinafter. It is to be noticed that each step illustrated in FIG. 7 may be implemented as a plurality of program codes and executed by a circuit (e.g., the controller 150), or alternatively, each step illustrated in FIG. 7 may be implemented as a plurality of logic gates, which constructs no limitations to the present invention. Additionally, the method illustrated in FIG. 7 can be applied along with the exemplary embodiments described above or independently, which is not limited in the invention.

To sum up, in the computer system and the controlling method for the hard disk provided by the embodiments of the present invention, when the hard disk is subjected to an excessively large pressure from the external, the head is moved away from the access range, such that the platter is prevented from being damaged by the head, and the data in the hard disk is protected.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A computer system, comprising:
a case;
a hard disk, disposed in the case and comprising a platter and a head, wherein the head is configured to access the platter within an access range;
a pressure sensor, disposed between the hard disk and the case and configured to sense a pressure applied to the hard disk due to an external force and obtain a pressure value; and
a controller, coupled to the pressure sensor and the hard disk and configured to determine whether the pressure value is larger than or equal to a threshold,
wherein if the pressure value is larger than or equal to the threshold, the controller issues a command to the hard disk, such that the head leaves the access range so as to protect the platter from being damaged by the head.

2. The computer system according to claim 1, wherein the hard disk further comprises a spindle, and the pressure sensor is disposed between the spindle and the case.

3. The computer system according to claim 1, wherein the command is a parking command, the controller issues the parking command to the hard disk so as to park the head at a landing zone of the platter.

4. The computer system according to claim 3, wherein after the head is parked, the pressure sensor re-obtains the pressure value, and the controller determines whether the re-obtained pressure value is smaller than the threshold,
if the re-obtained pressure value is smaller than the threshold, the controller instructs the head to move to the access range.

5. The computer system according to claim 4, wherein the controller instructs the head to move to a specific position in the access range.

6. The computer system according to claim 1, wherein the threshold is calculated according to a pressure limit of the hard disk.

7. The computer system according to claim 1, wherein the pressure sensor is a thin-film pressure sensor.

8. A controlling method for a hard disk, applicable to a computer system, wherein the computer system comprises a case, a hard disk and a pressure sensor, the pressure sensor is disposed between the hard disk and the case, the hard disk comprises a platter and a head, and the head is configured to access the platter within an access range, the method comprising:
sensing a pressure applied to the hard disk due to an external force and obtaining a pressure value by using the pressure sensor;
determining whether the pressure value is larger than or equal to a threshold; and
if the pressure value is larger than or equal to the threshold, issuing a command to the hard disk to instruct the head to leave the access range so as to protect the platter from being damaged by the head.

9. The method according to claim 8, wherein the hard disk further comprises a spindle, and the pressure sensor is disposed between the spindle and the case.

10. The method according to claim 8, wherein the command is a parking command, and the step of issuing the command to instruct the head to leave the access range if the pressure value is larger than or equal to the threshold comprises:

issuing the parking command to the hard disk so as to park the head at a landing zone of the platter.

11. The method according to claim 10, wherein after the step of parking the head at the landing zone of the platter, the method further comprises:
re-obtaining the pressure value by using the pressure sensor;
determining whether the re-obtained pressure value is smaller than the threshold; and
if the re-obtained pressure value is smaller than the threshold, instructing the head to move to the access range.

12. The method according to claim 11, wherein the step of instructing the head to move to the access range comprises:
instructing the head to move to specific position in the access range.

13. The method according to claim 8, wherein the threshold is calculated according to a pressure limit of the hard disk.

14. The method according to claim 8, wherein the pressure sensor is a thin-film pressure sensor.

* * * * *